US011453475B1

(12) United States Patent
Dooley

(10) Patent No.: US 11,453,475 B1
(45) Date of Patent: Sep. 27, 2022

(54) VARIABLE CAMBER SEGMENTED CONTROL SURFACES

(71) Applicant: The United States of America as represented by the Secretary of the Navy, Newport, RI (US)

(72) Inventor: Richard E Dooley, Portsmouth, RI (US)

(73) Assignee: The United States of America as represented by the Secretary of the Navy

( * ) Notice: Subject to any disclaimer, the term of this patent is extended or adjusted under 35 U.S.C. 154(b) by 120 days.

(21) Appl. No.: 17/020,872

(22) Filed: Sep. 15, 2020

(51) Int. Cl.
*B64C 3/48* (2006.01)
*B64C 3/10* (2006.01)
*B64C 13/30* (2006.01)
*B64F 5/10* (2017.01)
*B64C 3/18* (2006.01)

(52) U.S. Cl.
CPC .................. *B64C 3/48* (2013.01); *B64C 3/10* (2013.01); *B64C 3/187* (2013.01); *B64C 13/30* (2013.01); *B64F 5/10* (2017.01)

(58) Field of Classification Search
CPC ................ B64C 3/48; B64C 9/04; B64C 3/44
See application file for complete search history.

(56) References Cited

U.S. PATENT DOCUMENTS

| | | | | |
|---|---|---|---|---|
| 5,004,189 A * | 4/1991 | Igram | ....................... | B64C 3/48 244/219 |
| 6,123,297 A * | 9/2000 | Berry | ....................... | B64C 3/50 244/214 |
| 6,138,956 A * | 10/2000 | Monner | ................... | B64C 13/24 244/215 |
| 6,173,924 B1 * | 1/2001 | Young | ....................... | B64C 9/02 244/90 R |
| 8,348,201 B2 * | 1/2013 | Pecora | ..................... | B64C 9/04 244/219 |
| 8,371,523 B2 * | 2/2013 | Meinberg Macedo | ... | B64C 9/02 244/87 |
| 8,678,324 B2 * | 3/2014 | Hemmelgarn | ........ | F03D 1/0675 416/240 |
| 9,061,752 B2 * | 6/2015 | Nagel | ....................... | B64C 9/00 |
| 9,233,749 B1 * | 1/2016 | Joo | .......................... | B64C 3/48 |
| 9,896,188 B1 * | 2/2018 | Joo | ........................ | B64C 3/187 |
| 10,464,659 B2 * | 11/2019 | Tiryaki | ................... | B64C 23/06 |
| 10,745,107 B1 * | 8/2020 | Ol | ............................ | B64C 13/30 |
| 11,273,902 B2 * | 3/2022 | Gatto | ...................... | B64C 3/187 |

(Continued)

*Primary Examiner* — Joshua J Michener
*Assistant Examiner* — Michael B. Kreiner
(74) *Attorney, Agent, or Firm* — James M. Kasischke; Michael P. Stanley

(57) ABSTRACT

A variable camber wing for mounting to a vehicle chassis has an actuator shaft and a static pin extending from the chassis. The wing's nose segment defines a proximal edge and a distal edge and has a channel therethrough between the proximal and distal edges, an arcuate aperture therethrough aft of the channel, and a second aperture therethrough aft of the arcuate aperture. The wing has a first linkage defining a clevis on a proximal end and hingeably connected to the nose segment. The clevis can rotatably engage with the static pin extending through the arcuate aperture. A second linkage defines a second clevis on a proximal end and a distal edge. The second linkage is configured to hingeably connect to the first linkage.

11 Claims, 5 Drawing Sheets

(56) References Cited

U.S. PATENT DOCUMENTS

2011/0061579 A1* 3/2011 Van Gelder ........... F04D 29/323
                                                    114/151
2021/0331781 A1* 10/2021 Bae ......................... B64C 3/26

* cited by examiner

VARIABLE CAMBER SEGMENTED CONTROL SURFACES

STATEMENT OF GOVERNMENT INTEREST

The invention described herein may be manufactured and used by or for the Government of the United States pf America for governmental purposes without the payment of any royalties thereon or therefor.

CROSS REFERENCE TO OTHER PATENT APPLICATIONS

None.

BACKGROUND OF THE INVENTION

(1) Field of the Invention

This application and the subject matter disclosed herein (collectively referred to as the "disclosure"), generally concern variable camber segmented control surfaces, and related systems and methods. More particularly, but not exclusively, this disclosure pertains to systems, methods, and components that use segmented levers assembled to articulate in both positive and negative symmetric cambers by means of a single degree of freedom rotary actuation shaft. As but one illustrative example, an airfoil may have three or more segments hingeably connected together that collectively provide a control surface. The camber of the airfoil and the angle of attack can be varied by angular displacement of one of the segments.

(2) Description of the Prior Art

A foil, such as an airfoil or a hydrofoil, is the cross-sectional shape of a wing, blade or sail. A foil-shaped structure moving through a fluid, e.g., water or air, produces an aerodynamic force having a lift component perpendicular to the direction of motion, and a drag component parallel to the direction of motion. The surface of the foil-shaped structure is referred to as a control surface. The shape of the control surface, e.g., its camber or curvature, and an angle of attack of the control surface relative to the direction of motion affects the amount of lift produced at a given speed.

The need for more control authority at slower speeds while maintaining minimal drag at higher speeds is always a challenge for control surface design for vehicles. Conventional approaches have increased the size of the control surface as needed due to volume limitations of the vehicle and control surface itself. A disadvantage to simply increasing the size of the control surface is that drag is increased at higher speeds. Another disadvantage is that the larger control surfaces may interfere with external interfaces, e.g., with ports or launch tubes, or may require the external interfaces to be repositioned in the vehicle design.

Modern commercial aircraft include flap systems to vary the control surfaces of the aircraft wings. However, these flap systems are relatively complex, requiring mechanisms, e.g., multiple actuators, to extend a flap and to change the angle of the flap relative to the rest of the wing to change the size and camber of the control surface.

SUMMARY OF THE INVENTION

The disclosed embodiments provide a segmented control surface whose camber may be varied both positively and negatively with a single rotary actuation shaft. The disclosed embodiments may also provide increased lift compared to similarly sized angled symmetric airfoils.

In some respects, concepts disclosed herein generally concern variable camber segmented control surfaces. Some disclosed concepts pertain to systems, methods, and components to provide a control surface with an adjustable and variable camber controlled through a single degree of freedom actuator. As but one example, some disclosed control surfaces may have three or more segments hingeably connected together that collectively provide the control surface. The camber of the airfoil and the angle of attack can be varied by angular displacement of one of the segments.

In one aspect, a variable camber wing for mounting to a vehicle chassis can have an actuator shaft extending from the vehicle chassis that is capable of angular rotation about an axis of the actuator shaft and a static pin affixed to the vehicle chassis. The wing can have a nose segment defining a proximal leading edge and a distal edge. The nose segment can have a channel through the segment and positioned between the proximal leading edge and the distal edge, an arcuate aperture therethrough aft of the channel, and a second aperture therethrough aft of the arcuate aperture. The nose segment has a head formed at the distal edge. The actuator shaft can be affixed in the channel to rotate the nose segment.

The wing can have a first linkage defining a clevis on a proximal end and a distal end aft of the proximal end. The first linkage can be configured to hingeably connect to the nose segment, wherein the clevis is complementarily configured to rotatably engage with the static pin extending through the arcuate aperture. The wing can have a second linkage defining a second clevis on a proximal end and a trailing distal edge. The second linkage can be configured to hingeably connect to the first linkage, wherein the second clevis is complementarily configured to rotatably engage with the head of the nose segment.

The wing can have a pedestal affixed to the vehicle chassis, wherein the static pin and the actuator shaft extend orthogonally from the pedestal, and wherein the wing is arranged opposite the vehicle chassis relative to the pedestal.

The wing can have a smooth elastomeric coating fixed to and extending over the nose segment, the first linkage and the second linkage. The wing can define an asymmetrical airfoil when the nose segment is rotated with respect to the vehicle chassis by the actuator shaft to an actuation angle. The nose segment, the first linkage, and the second linkage in combination can define a first camber at a first actuation angle, and a second camber at a second actuation angle.

The first linkage can have a first hinge aperture therethrough aft of the clevis and configured to be aligned axially with the second aperture of the nose segment. The first linkage can be hingeably connected to the nose segment when a pin is inserted through the first hinge aperture and the second aperture.

The first linkage can have second hinge aperture therethrough aft of the first hinge aperture, and the second linkage can have a third hinge aperture therethrough aft of the second clevis. The third hinge aperture can be configured to align axially with the second hinge aperture of the first linkage. The first linkage can be hingeably connected to the second linkage when a second pin is inserted through the aligned second and third hinge apertures.

The nose segment, the first linkage, and the second linkage can define a first variable camber wing rib, wherein the variable camber wing comprises a plurality of adjacent variable camber wing ribs. Each of the respective nose segments of the respective plurality of variable camber wings can be hingeably connected to an adjacent first linkage, and each of the respective second linkages of the respective plurality of variable camber wings can be hingeably connected to an adjacent first linkage.

The second linkage can define a top surface and a bottom surface, where the top and bottom surfaces taper toward each other from the third hinge aperture to the second clevis.

The wing can have at least one additional linkage, configured to hingeably connect with an adjacent linkage.

In another aspect, a variable camber wing for mounting to a vehicle chassis can have a nose segment defining a proximal leading edge and a distal edge. The nose segment can have a channel therethrough between the proximal leading edge and the distal edge, an arcuate aperture therethrough aft of the channel, and a second aperture therethrough aft of the arcuate aperture. The nose segment can have a head formed at the distal edge.

The wing can have a first linkage defining a clevis on a proximal end and a distal end aft of the proximal end. The first linkage can be configured to hingeably connect to the nose segment, wherein the clevis overlaps the arcuate aperture. The wing can have a second linkage defining a second clevis on a proximal end and a trailing distal edge. The second linkage can be configured to hingeably connect to the first linkage, wherein the second clevis is complementarily configured to rotatably engage with the head of the nose segment.

The wing can have an actuator shaft extending from the vehicle chassis through the channel and capable of angular rotation about an axis of the actuator shaft; and a static pin affixed to the vehicle chassis and extending through the arcuate aperture, wherein the clevis is complementarily configured to rotatably engage with the static pin.

The first linkage can have a first hinge aperture therethrough aft of the clevis and configured to be aligned axially with the second aperture of the nose segment wherein the first linkage is hingeably connected to the nose segment when a pin is inserted through the first hinge aperture and the second aperture.

The first linkage can have a second hinge aperture therethrough aft of the first hinge aperture, and the second linkage having a third hinge aperture therethrough aft of the second clevis. The third hinge aperture can be configured to align axially with the second hinge aperture of the first linkage wherein the first linkage is hingeably connected to the second linkage when a second pin is inserted through the aligned second and third hinge apertures.

The nose segment, the first linkage, and the second linkage can define a first variable camber wing rib, wherein the variable camber wing comprises a plurality of adjacent variable camber wing ribs. Each of the respective nose segments of the respective plurality of variable camber wings can be hingeably connected to an adjacent first linkage, and each of the respective second linkages of the respective plurality of variable camber wings can be hingeably connected to an adjacent first linkage.

The second linkage can define a top surface and a bottom surface, wherein the top and bottom surfaces taper toward each other from the third hinge aperture to the second clevis.

The wing can have a smooth elastomeric coating fixed to and extending over the nose segment, the first linkage and the second linkage.

The wing can have at least one additional linkage, configured to hingeably connect with an adjacent linkage.

Also disclosed are associated methods for making a variable camber segmented wing.

The foregoing and other features and advantages will become more apparent from the following detailed description, which proceeds with reference to the accompanying drawings.

BRIEF DESCRIPTION OF THE DRAWINGS

Referring to the drawings, wherein like numerals refer to like parts throughout the several views and this specification, aspects of presently disclosed principles are illustrated by way of example, and not by way of limitation.

DETAILED DESCRIPTION OF THE INVENTION

Figure 1A:
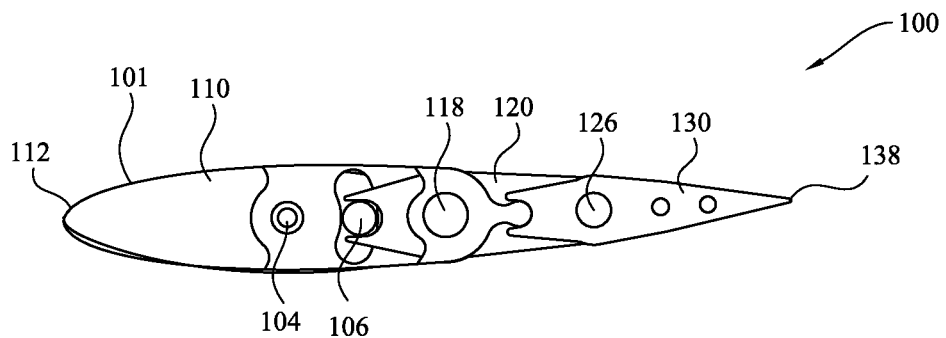
FIG. 1A illustrates a partially cutaway view of a variable camber segmented wing.
Figure 1B:
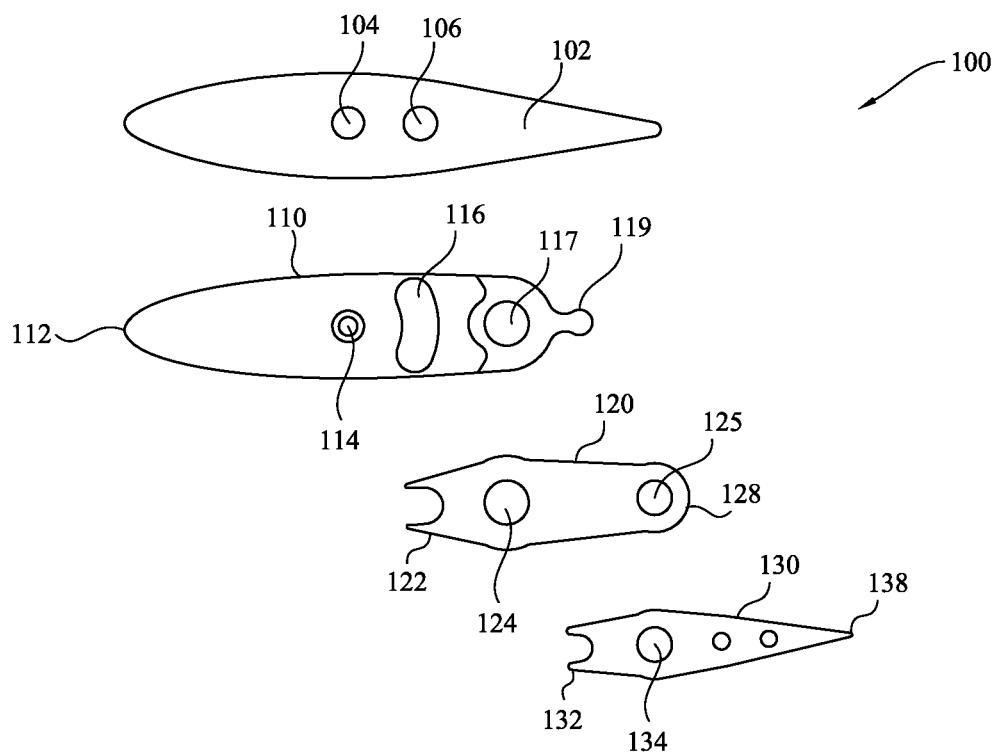
FIG. 1B illustrates an exploded view of the variable camber segmented wing.

The following describes various principles related to variable camber segmented control surfaces. For example, certain aspects of disclosed principles pertain to assemblies of segmented levers configured to articulate in both positive and negative symmetric cambers by means of a single degree of freedom rotary actuation shaft, without the need for secondary actuators. That said, descriptions herein of specific apparatus configurations and combinations of method acts are but particular examples of contemplated systems chosen as being convenient illustrative examples of disclosed principles. One or more of the disclosed principles can be incorporated in various other systems to achieve any of a variety of corresponding system characteristics.

Thus, systems having attributes that are different from those specific examples discussed herein can embody one or more presently disclosed principles, and can be used in applications not described herein in detail. Accordingly, such alternative embodiments also fall within the scope of this disclosure.

Conventionally, improving control at lower speeds in wing design has led to larger control surfaces. However, larger control surfaces typically create more drag at higher speed. Some wings are made with flaps that may be temporarily extended and/or angled to increase the control surface and/or modify the camber when needed, e.g., at slower speeds. These flap systems are complex mechanically and electrically, and thus may be more expensive to use and maintain. These flap systems may be more subject to mechanical failure and/or control system errors.

Accordingly, an approach to a variable camber wing that is relatively simpler and provides a relatively more adjustable camber and improved lift is needed. The principles disclosed herein overcome many problems in the prior art and address one or more of the aforementioned or other needs.

Further details of disclosed principles are set forth below. Section II describes principles pertaining to a segmented airfoil whose camber can be varied with a single actuator.

Section III describes principles pertaining to improvements in lift provided by the disclosed embodiments.

The following description and related figures are presented in context of a symmetric wing, but following a review of this disclosure, a person of ordinary skill in the art will readily appreciate that principles disclosed herein can be adapted for other control surface configurations (e.g., non-symmetrical control surfaces) whose camber may be varied both positively and negatively with a single rotary actuation shaft by means of a plurality of hingeably interconnected segments of the control surface. A single actuator shaft can rotate one segment, and by virtue of the hingeable connections among the plural segments, adjust the camber of the wing. Although the discussion references airfoils and wings, the disclosed principles and constructs may also apply to hydrofoils and fins or other control surfaces configured to move through a fluid.

FIG. 1A shows a partial cutaway view of a variable camber wing 100 with a cover 101 partially removed to reveal internal components of the wing. The wing 100 that may be singularly actuated through a rotary shaft to provide bi-directional variable camber. Cover 101 is a pre-stretched elastomeric material. This can be made from a variety of resilient materials known in the art. FIG. 13 shows an exploded view of the wing 100 showing each of several segments, as well as a pedestal 102 to which the wing 100 mounts. Pedestal 102 can function to separate the variable camber wing 100 from a vehicle chassis or a static wing portion. The wing 100 may include three segments, for example, a nose section 110, a first linkage 120, and a second linkage 130.

The wing 100 may be configured to be installed onto the pedestal 102 on a vehicle chassis. The pedestal 102 may include an actuator shaft 104 extending orthogonally from the pedestal and a static pin 106 extending orthogonally from the pedestal.

The nose segment 110 may define a proximal leading edge 112 and a distal edge at a head 119. The leading edge 112 is defined as the point on the front of the airfoil having maximum curvature. The nose segment 110 may include a channel 114 disposed between the proximal edge and the distal edge. The channel 114 may extend spanwise through the nose segment 110 and may receive the actuator shaft 104 therethrough when the wing 100 is installed on the pedestal 102. The shaft 104 may have splines and the channel 114 may have complementary splines that mate with the splines on the shaft 104 when the shaft extends through the channel. The mated splines can inhibit relative rotation between the shaft 104 and the nose segment 110, allowing the shaft 104 to rotate the nose segment 110 as the shaft 104 rotates.

The nose segment 110 may include an arcuate aperture 116 aft of the channel 114 (e.g., between the channel 114 and the head 119. The arcuate aperture 116 may extend spanwise through the nose segment and extend generally transversely relative to the nose segment. The arcuate aperture 116 may receive the static pin 106 therethrough, when the wing 100 is installed on the pedestal 102. When so installed, the actuator shaft 104 may be configured to rotate the nose section 110 with respect to the chassis surface. The rotation may change the angle of attack of the nose segment 110, and of the wing 100, and the arcuate aperture 116 can allow the nose segment 110 to rotate without binding on the static pin 106.

The nose segment 110 may include a hinge aperture 117 between the arcuate aperture 116 and the head 119, which may form part of a hinge connector.

The linkage 120 may define a clevis 122 on a proximal end. The linkage 120 may define a distal end 128 aft of the clevis 122. The linkage 120 may include a hinge connector configured to hingeably connect the linkage to the nose segment. For example, the linkage 120 may include a first hinge aperture 124 aft of the clevis. The hinge connector may comprise the first hinge aperture 124 axially aligned with the hinge aperture 117 of the nose segment and a pin 118 inserted through the aligned apertures to hingeably connect the first linkage 120 to the nose segment 110 with the apertures 117 and 124 in spanwise alignment with the pin 118 extending through the aligned apertures. When so hingeably connected, the clevis 122, which overlaps the arcuate aperture 116 and is complementarily configured relative to the static pin 106, can rotatably engage with the static pin 106 extending through the arcuate aperture 116. Thus, as the shaft 104 rotates, the nose segment 110 also will rotate, causing the aperture 117 to swing through a first arc. As the aperture 124 is hingeably connected with the aperture 117 by the pin 118, the aperture 124 will swing through the same arc as the aperture 117 by virtue of the shaft 114 rotating. However, the clevis 122, which is hingeably connected with the static shaft 106, imparts a restraining force to a proximal end of the first linkage 120 as the aperture 124 swings through an arc. Consequently, the first linkage 120 will rotate relative to the nose segment 110. The linkage 120 may also include a second hinge aperture 125 aft of the first hinge aperture 124.

The second linkage 130 may define a second clevis 132 on a proximal end, together with a trailing distal edge 138. The trailing edge of an airfoil is defined as the point of maximum curvature on the rear end of the airfoil. The linkage 130 may include a second hinge connector configured to hingeably connect the second linkage 130 to the first linkage 120. For example, the linkage 130 may include a third hinge aperture 134. The hinge connector may comprise the third hinge aperture 134 axially aligned with the second hinge aperture 125 of the linkage 120 and a pin 126 inserted through the aligned apertures to hingeably connect the second linkage 130 to the first linkage 120. When so hingeably connected, the second clevis 132 may be complementarily configured to rotatably engage with the head 119 of the nose segment.

Although two linkages are described and shown in FIG. 13, additional linkages can be added using the same type of hinge and clevis connections as the first linkage and the second linkage.

The illustrated arrangement of the nose segment 110 and the linkages 120, 130 permits the effective camber of the control surface of the wing 100 to be altered as the nose segment 110 is angularly displaced by the rotation of the actuator shaft 104.

Figure 2A:
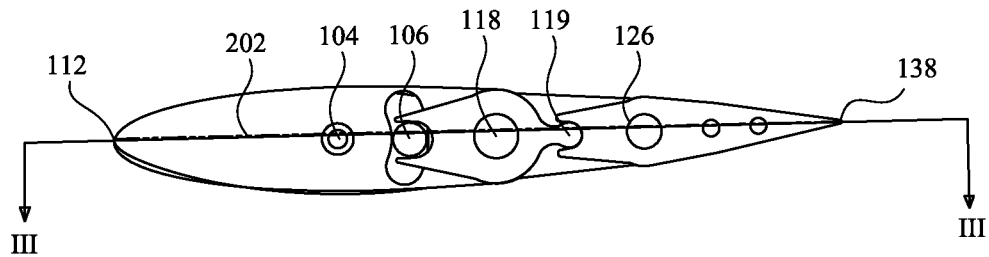
FIGS. 2A, 2B, and 2C illustrate the variable camber segmented wing at different actuation angles.
Figure 2B:
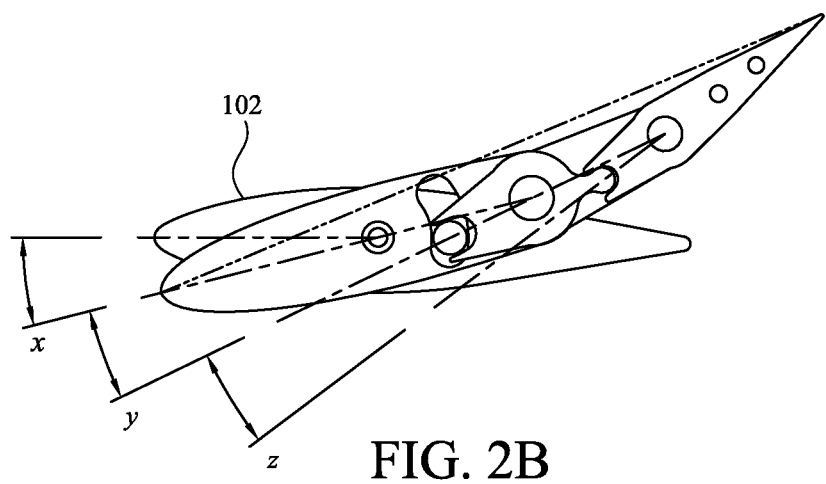
Figure 2C:
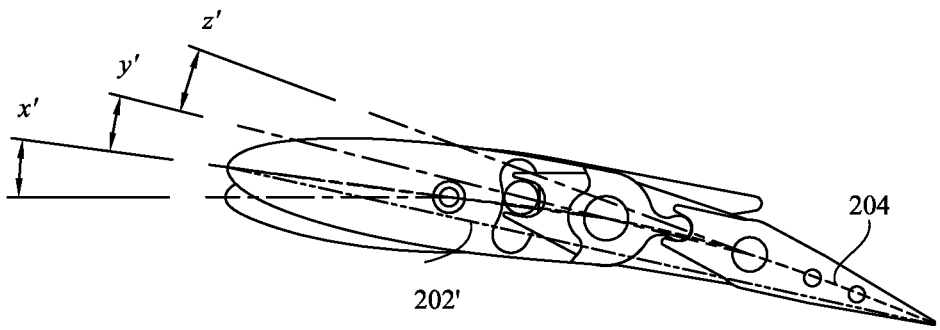

FIGS. 2A-2C illustrate the wing 100 at different actuation angles, resulting in different cambers and angles of attack. FIG. 2A shows the wing 100 in an unactuated configuration, e.g., at an actuation angle of zero, and at a zero attack angle. In this context, "unactuated" means that the nose segment 110 is not rotated with respect to the pedestal. An airfoil defines a chord line, which is the straight line between the leading edge and the trailing edge. A mean camber line of an airfoil is defined as the locus of points midway between the upper and lower surfaces. In the unactuated configuration, the wing 100 may be symmetrical, in the sense that the mean camber line and the chord line are the same line, shown as line 202, and that the shape of the airfoil above the chord mirrors the shape of the airfoil below the chord.

FIG. 2B shows the wing 100 at a first actuation angle x relative to the pedestal 102. The actuator shaft 104 has caused the nose segment 110 to rotate about the actuator shaft 104. The arcuate aperture 114 allows the nose segment 110 to move relative to the static pin 106, such that the static pin 106 extends through the lower part of the arcuate aperture 116. The clevis 122 of the first linkage 120 rotates about the static pin 106, and the hinged connection at pin 118 allows the angle y of the linkage 120 relative to the nose segment 110 to change.

The clevis 132 of the second linkage 130 rotates about the head 119 of the nose segment 110. The hinged connection at pin 126 allows the angle z of the second linkage 130 relative to the first linkage 120 to change. The head 119 may extend aftward by a neck that is narrower than a diameter of the head. The narrower width of the neck may allow the ends of the clevis to pivot more fully about the head, thereby permitting further deflection of the second linkage relative to the first linkage.

The proximal end of the second linkage 130, e.g., the top and bottom surfaces extending between the clevis 132 and the aperture 134, may be tapered toward the clevis such that, when the second linkage is angled away from the first linkage, the tapered surfaces do not protrude above the top surface or below the bottom surface of the first linkage.

FIG. 2C shows the wing 100 at a different actuation angle x' of the nose segment 110 relative to the pedestal 102. The change in the actuation angle causes the angle of the linkage 120 relative to the nose segment 110 to change to angle y'. The change to the angles and in turn causes the angle of the second linkage 130 relative to the first linkage 120 to change to the angle z'.

Of note is that the chord line of the airfoil has changed relative to the unactuated airfoil, seen as line 202'. Because the camber has changed, the mean camber line 204 has also changed relative to the mean camber line of the unactuated airfoil. The mean camber line 204 does not align with the chord line 202'.

Although only three different actuation angles are illustrated herein, the wing 100 may be actuated to any angle in a range of angles relative to the pedestal between ±90°, such as, for example, ±3°, ±6°, ±8°, ±10°, ±15°, ±25°, ±30°, or ±45°.

Two linkages are shown in relation to the nose segment, however, the number and position of the segments can be varied as needed. A higher number of linkages may provide a smoother piecewise linear fit to a theoretically smooth cambered airfoil. Additionally, a pre-stretched smooth elastomeric coating may be fixed to each segment and linkage outside the hinged regions to minimize flow disturbances and therefore increase lift performance and minimize drag.

Figure 3:
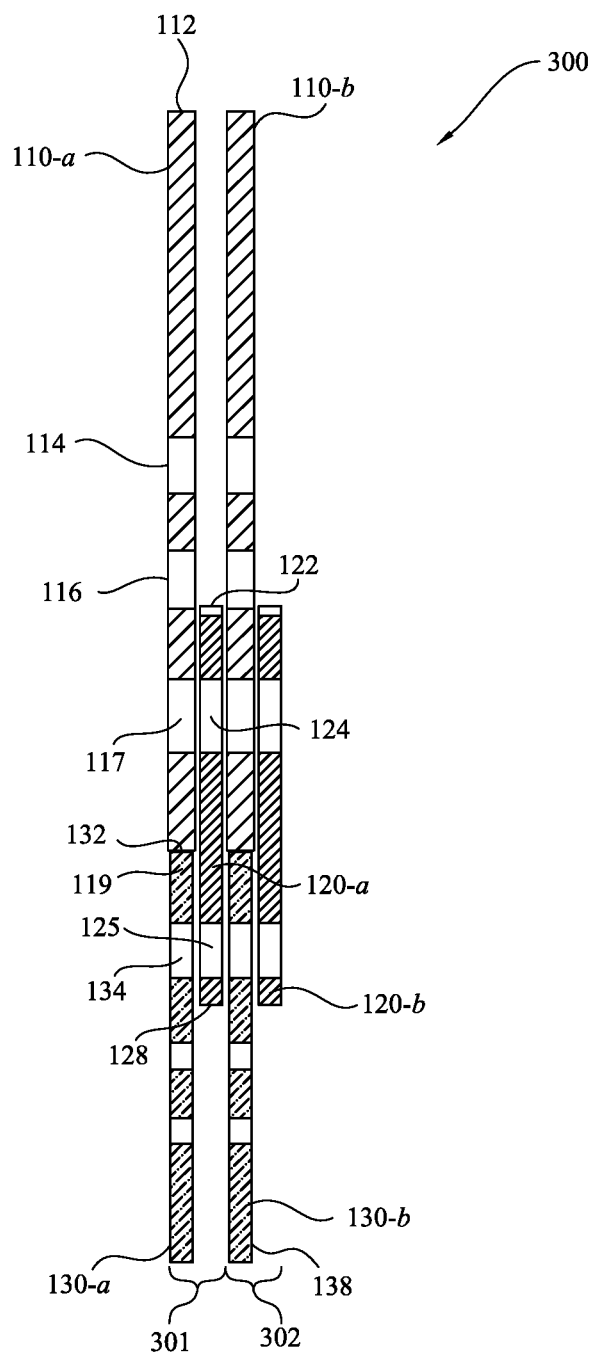
FIG. 3 shows a cross-sectional view taken along a plane represented by section line shown in FIG. 2A.

In an embodiment, a nose segment 110, a first linkage 120, and a second linkage 130 may define a variable camber wing rib. A plurality of variable camber wing ribs may be interleaved to form a wider control surface for a wing as illustrated in FIG. 3. FIG. 3 shows a cross-sectional view of the interleaved components taken along a plane represented by section line III-III shown in FIG. 2A. The scale of the components in the figure is exaggerated for clarity. A variable camber rib 301 may be defined, for example, by a nose segment 110-$a$, a first linkage 120-$a$, and second linkage 130-$a$. The second linkage 130-$a$ may be positioned linearly directly aft of the nose segment 110-$a$ such that the clevis 132 of the second linkage 130-$a$ engages with the head 119 of the nose segment 110-$a$.

The first linkage 120-$a$ may be positioned parallel and adjacent to the second linkage 130-$a$ and the nose segment 130-$a$ in a spanwise direction. The first linkage 120-$a$ may be positioned such that the clevis 122 may engage with the static pin 106 when the static pin 106 is present within the aperture 116. The aperture 124 of the first linkage 120-$a$ may be axially aligned with the aperture 117 of the nose segment 110-$a$ such that the pin 118 may be placed therethrough. The aperture 125 of the first linkage 120-$a$ may be axially aligned with the aperture 134 of the second linkage 130-$a$ such that the pin 126 may be inserted therethrough.

The arrangement may be repeated, for example, with another variable camber wing rib 302, defined by a nose segment 110-$b$, a first linkage 120-$b$, and a second linkage 130-$b$. The nose segment 110-$b$ and second linkage 130-$b$ may be parallel and adjacent to the first linkage 120-$a$, and the first linkage 120-$b$ may be parallel and adjacent to the nose segment 110-$b$ and second linkage 130-$b$. The arrangement may be repeated still further to obtain a desired span for the control surface of the wing.

Figure 4:
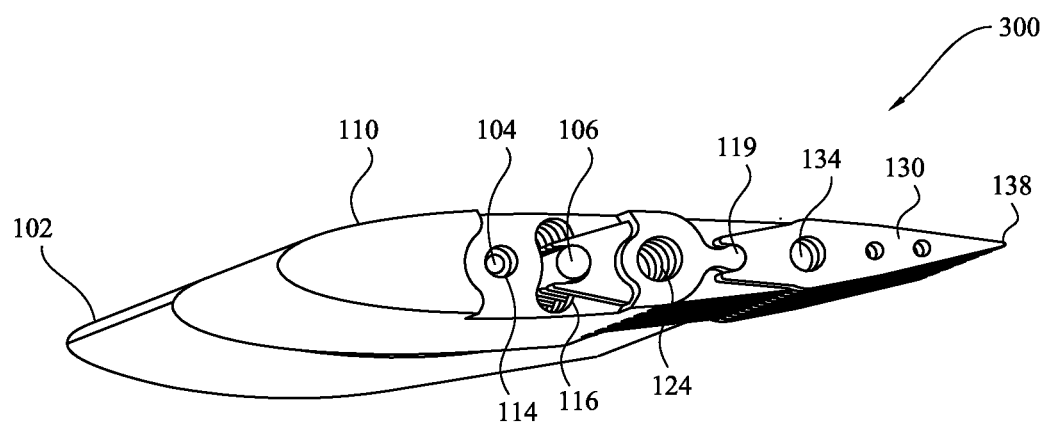
FIG. 4 shows an isometric view of a variable camber segmented wing in an unactuated configuration.
Figure 5:
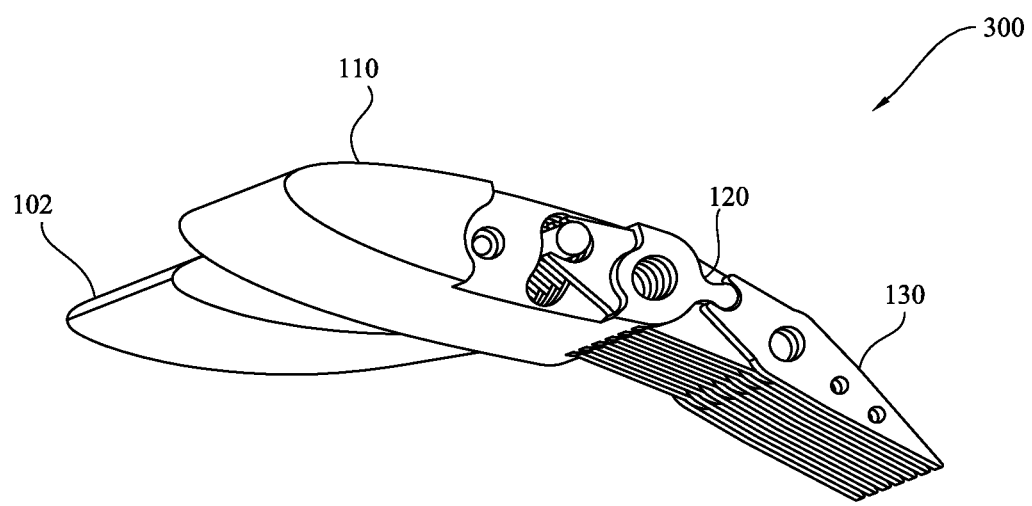
FIG. 5 shows an isometric view of the variable camber segmented wing in an actuated configuration.

For example, FIGS. 4 and 5 show an isometric view of a wing 300 having a plurality of nose segments 110, first linkages 120 and second linkages 130 in an interleaved arrangement as shown in FIG. 3. FIG. 4 shows the wing 300 in an unactuated configuration. FIG. 5 shows the wing 300 in an actuated configuration. Part of the outer surface of outermost nose segment 110 is cutaway to show, namely, the actuator shaft 104 extending into the aperture 114 in the nose segment 110, the static pin 106 extending through the arcuate aperture 116. The nose segment 110 also includes the aperture 117 aft of the arcuate aperture 116 to receive a pin.

Figure 6:
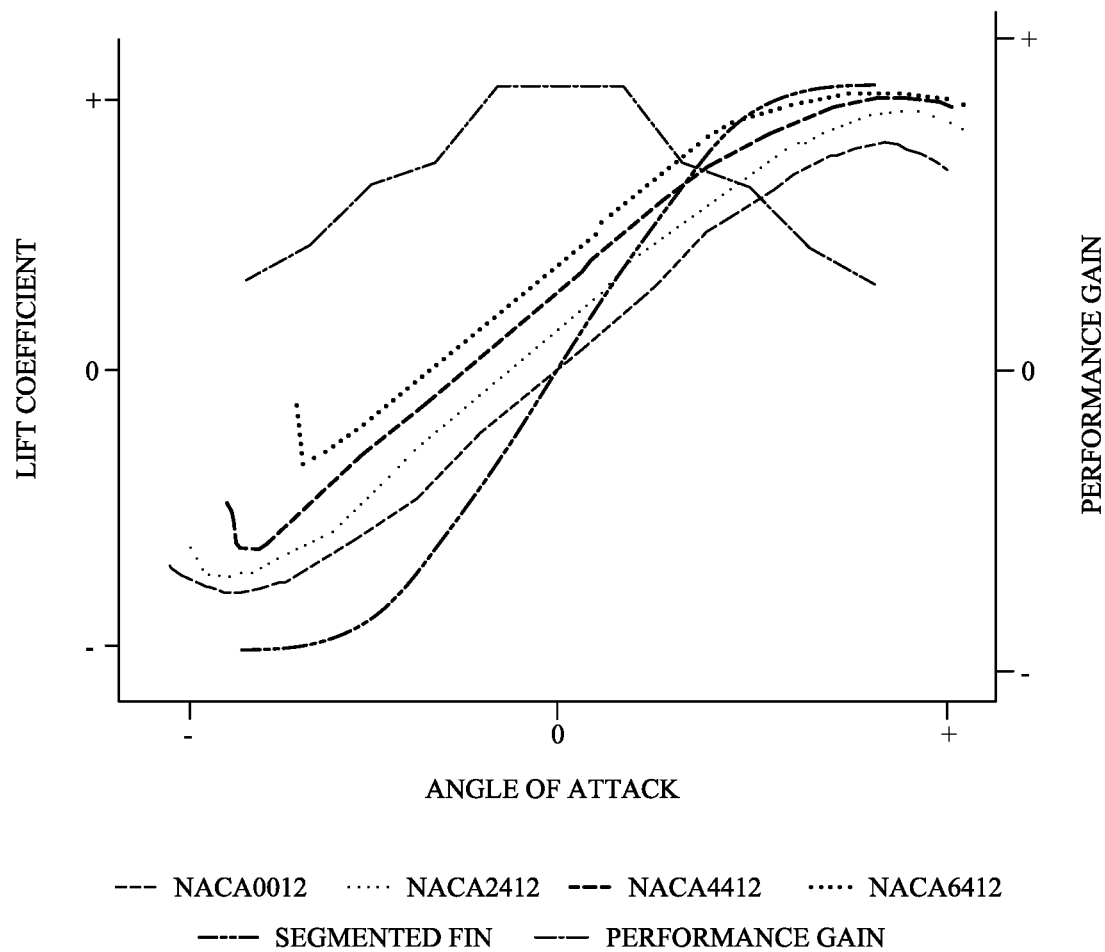
FIG. 6 shows a graph of the lift of an airfoil, and a performance gain, as a function of angle of attack.

FIG. 6 shows a graph that illustrates the lift of an airfoil, and a performance gain, as a function of angle of attack for four known National Advisory Committee for Aeronautics (NACA) airfoils, and for an embodiment of the wing described above. The graph also illustrates a performance gain of wing over an angled symmetric airfoil, e.g., a NACA 0012 airfoil.

Table 1 below illustrates an expected lift improvement for an embodiment of the disclosed wing compared to an angled symmetric airfoil.

TABLE 1

| Angle of Attack (deg) | Theoretical Improved lift over angled symmetric airfoil |
|---|---|
| −15.00 | 26% |
| −12.00 | 37% |
| −9.00 | 56% |
| −6.00 | 63% |
| −3.00 | 86% |
| 3.00 | 86% |
| 6.00 | 63% |
| 9.00 | 56% |
| 12.00 | 37% |
| 15.00 | 26% |

The examples described above generally concern apparatus, methods, and related systems for variable camber segmented control surfaces. More particularly, but not exclusively, disclosed principles pertain to systems, methods, and components that use segmented levers assembled to articulate in both positive and negative symmetric cambers by means of a single degree of freedom rotary actuation shaft.

Nonetheless, the previous description is provided to enable a person skilled in the art to make or use the disclosed principles. Embodiments other than those described above in detail are contemplated based on the principles disclosed herein, together with any attendant changes in configurations of the respective apparatus or changes in order of method acts described herein, without departing from the spirit or scope of this disclosure. Various modifications to the examples described herein will be readily apparent to those skilled in the art.

For example, the linkages may define different shapes than those described, provided that in an assembled configuration, an airfoil is still defined. The hinged connector may include any configuration that permits a hinged relationship between two adjacent components.

Directions and other relative references (e.g., up, down, top, bottom, left, right, rearward, forward, etc.) may be used to facilitate discussion of the drawings and principles herein, but are not intended to be limiting. For example, certain terms may be used such as "up," "down,", "upper," "lower," "horizontal," "vertical," "left," "right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" or "or", as well as "and" and "or." Moreover, all patent and non-patent literature cited herein is hereby incorporated by reference in its entirety for all purposes.

And, those of ordinary skill in the art will appreciate that the exemplary embodiments disclosed herein can be adapted to various configurations and/or uses without departing from the disclosed principles. Applying the principles disclosed herein, it is possible to provide a wide variety of variable camber segmented control surfaces and related methods and systems to increase control authority at slower speeds while maintaining minimal drag at higher speeds. For example, the principles described above in connection with any particular example can be combined with the principles described in connection with another example described herein. Thus, all structural and functional equivalents to the features and method acts of the various embodiments described throughout the disclosure that are known or later come to be known to those of ordinary skill in the art are intended to be encompassed by the principles described and the features and acts claimed herein. Accordingly, neither the claims nor this detailed description shall be construed in a limiting sense, and following a review of this disclosure, those of ordinary skill in the art will appreciate the wide variety of variable camber segmented control surfaces and related methods and systems that can be devised using the various concepts described herein.

Moreover, nothing disclosed herein is intended to be dedicated to the public regardless of whether such disclosure is explicitly recited in the claims. No claim feature is to be construed under the provisions of 35 USC 112(f), unless the feature is expressly recited using the phrase "means for" or "step for".

The appended claims are not intended to be limited to the embodiments shown herein, but are to be accorded the full scope consistent with the language of the claims, wherein reference to a feature in the singular, such as by use of the article "a" or "an" is not intended to mean "one and only one" unless specifically so stated, but rather "one or more". Further, in view of the many possible embodiments to which the disclosed principles can be applied, we reserve the right to claim any and all combinations of features and technologies described herein as understood by a person of ordinary skill in the art, including the right to claim, for example, all that comes within the scope and spirit of the foregoing description, as well as the combinations recited, literally and equivalently, in any claims presented anytime throughout prosecution of this application or any application claiming benefit of or priority from this application, and more particularly but not exclusively in the claims appended hereto.

What is claimed is:

1. A variable camber wing for mounting to a vehicle chassis comprising:
   an actuator shaft extending from the vehicle chassis and capable of angular rotation about an axis of said actuator shaft;
   a static pin affixed to the vehicle chassis;
   a nose segment defining a proximal leading edge and a distal edge, having a channel therethrough between said proximal leading edge and said distal edge, an arcuate aperture therethrough aft of said channel, and a second aperture therethrough aft of said arcuate aperture, and said nose segment having a head formed at said distal edge, said actuator shaft being affixed in said channel to rotate said nose segment;
   a first linkage defining a clevis on a proximal end, a distal end aft of said proximal end, said first linkage configured to hingeably connect to said nose segment, wherein said clevis is complementarily configured to rotatably engage with said static pin extending through said arcuate aperture; and
   a second linkage defining a second clevis on a proximal end and a trailing distal edge, the second linkage configured to hingeably connect to said first linkage, wherein said second clevis is complementarily configured to rotatably engage with said head of said nose segment.

2. The variable camber wing of claim 1, further comprising:
   a pedestal affixed to the vehicle chassis, wherein said static pin and said actuator shaft extend orthogonally from the pedestal, and wherein said wing is arranged opposite the vehicle chassis relative to said pedestal.

3. The apparatus of claim 1, further comprising a smooth elastomeric coating fixed to and extending over said nose segment, said first linkage and said second linkage.

4. The apparatus of claim 3, wherein said wing defines an asymmetrical airfoil when said nose segment is rotated with respect to the vehicle chassis by said actuator shaft to an actuation angle.

5. The apparatus of claim 4, wherein said nose segment, said first linkage, and said second linkage in combination define a first camber at a first actuation angle, and a second camber at a second actuation angle.

6. The apparatus of claim 1, said first linkage having a first hinge aperture therethrough aft of said clevis and configured to be aligned axially with said second aperture of said nose segment and wherein said first linkage is hingeably connected to said nose segment when a pin is inserted through said first hinge aperture and said second aperture.

7. The apparatus of claim 6, said first linkage having second hinge aperture therethrough aft of said first hinge aperture, and said second linkage having a third hinge aperture therethrough aft of said second clevis, said third hinge aperture configured to align axially with said second hinge aperture of said first linkage, wherein said first linkage is hingeably connected to said second linkage when a second pin is inserted through said aligned second and third hinge apertures.

8. The apparatus of claim 1, wherein said nose segment, said first linkage, and said second linkage define a first variable camber wing rib, wherein said variable camber wing comprises a plurality of adjacent variable camber wing ribs; wherein each of said respective nose segments of said respective plurality of variable camber wings is hingeably connected to an adjacent first linkage, and each of said respective second linkages of said respective plurality of variable camber wings is hingeably connected to an adjacent first linkage.

9. The apparatus of claim 1, wherein said second linkage defines a top surface and a bottom surface, wherein said top and bottom surfaces taper toward each other from said third hinge aperture to said second clevis.

10. The apparatus of claim 1, further comprising at least one additional linkage, configured to hingeably connect with an adjacent linkage.

11. The variable camber wing of claim 1, further comprising:
- an actuator shaft extending from said vehicle chassis through said channel and capable of angular rotation about an axis of said actuator shaft; and
- a static pin affixed to said vehicle chassis and extending through said arcuate aperture, wherein said clevis is complementarily configured to rotatably engage with said static pin.

* * * * *